United States Patent [19] [11] 4,315,441
Fukuda [45] Feb. 16, 1982

[54] TRANSMISSION FOR A HYDRAULICALLY DRIVEN VEHICLE

[75] Inventor: Eiichi Fukuda, Komatsu, Japan

[73] Assignee: Kabushiki Kaisha Komatsu Seisakusho, Tokyo, Japan

[21] Appl. No.: 101,436

[22] Filed: Dec. 10, 1979

[30] Foreign Application Priority Data

Dec. 11, 1978 [JP] Japan ................................ 53-151914

[51] Int. Cl.³ ............................................. F16H 37/06
[52] U.S. Cl. ............................... 74/665 M; 74/665 L; 180/308; 192/17 A
[58] Field of Search ............. 74/665 L, 665 M, 710.5, 74/713; 192/17 R, 20, 17 A, 91 A; 180/6.48, 308, 6.7

[56] References Cited

U.S. PATENT DOCUMENTS

| 2,000,709 | 5/1935 | Matthews | 74/665 L |
| 2,126,255 | 8/1938 | Hacker | 74/665 M |
| 2,229,153 | 1/1941 | Ware | 74/665 M |
| 2,717,523 | 9/1955 | Lammerz | 74/665 L |
| 2,848,086 | 8/1958 | Warsaw | 192/17 R |
| 2,890,034 | 6/1959 | Robbins et al. | 74/665 L |
| 3,292,720 | 12/1966 | Harvey | 74/710.5 X |
| 3,785,450 | 1/1974 | Suzuki | 180/6.7 |
| 4,067,260 | 1/1978 | Finsterwald | 74/710.5 |

Primary Examiner—George H. Krizmanich
Attorney, Agent, or Firm—Armstrong, Nikaido, Marmelstein & Kubovcik

[57] ABSTRACT

A transmission for a hydraulically driven vehicle comprising a final drive gear casing, a pair of hydraulic motor each having an output shaft connected thereto, the each output shaft being extended into the final drive gear casing and having formed thereon a bevel pinion, a pair of final drive shaft each being rotatably supported by the final drive gear casing and aligned with each other, a pair of bevel gears each fixedly mounted on the respective final drive shaft, each of the bevel gears being adapted to mesh with the respective bevel pinions, a clutch provided between the pair of final drive shaft for directly connecting and disconnecting the same, and a brake mounted on the clutch.

2 Claims, 1 Drawing Figure

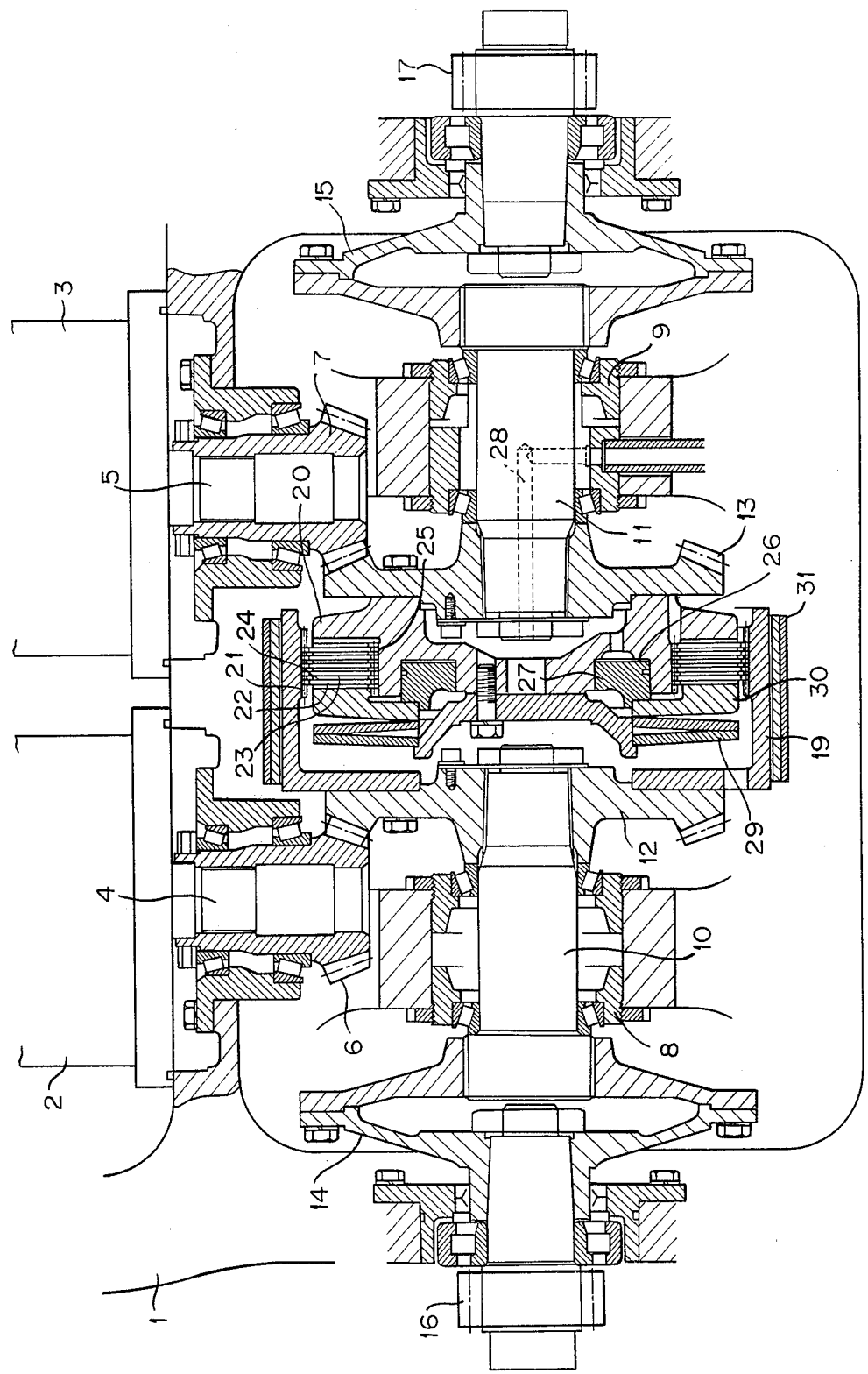

TRANSMISSION FOR A HYDRAULICALLY DRIVEN VEHICLE

BACKGROUND OF THE INVENTION

This invention relates to a transmission for a hydraulically driven vehicle provided with a clutch for directly connecting and disconnecting final two drive shafts installed on each side of the vehicle.

A typical hydraulically driven vehicle has two hydraulic motors each mounted for independently driving one side of vehicle's wheels. Generally, it is difficult to keep such a vehicle to travel straight on since both sides of wheels are not in synchronism with each other. To improve the straight-run capability of such a vehicle, it is advisable to provide a clutch between two final drive shafts for directly connecting them.

In a conventional transmission, however, since each final drive gear unit has a brake mounted thereon, there is generally no space available to provide a direct-coupling clutch for connecting and disconnecting final two drive shafts. Accordingly, there has been no transmission for a hydraulically driven vehicle which has a direct-coupling clutch mounted thereon.

SUMMARY OF THE INVENTION

It is therefore an object of the present invention to provide a transmission for a hydraulically driven vehicle which can improve the straight-run capability of the vehicle by providing a brake mounted direct-coupling clutch between two final drive shafts.

Another object of the present invention is to provide a transmission for a hydraulically driven vehicle which is simple in construction and yet capable of providing a good straight-run capability.

In accordance with an aspect of the present invention, there is provided a transmission for a hydraulically driven vehicle, comprising: a final drive gear casing; a pair of hydraulic motor means each having an output shaft connected thereto, the each output shaft being extended into said final drive gear casing and having formed thereon a bevel pinion; a pair of final drive shaft means each being rotatably supported by said final drive gear casing and aligned with each other; a pair of bevel gears each fixedly mounted on said respective final drive shaft means, each of said bevel gears being adapted to mesh with said respective bevel pinions; clutch means provided between said pair of final drive shaft means for directly connecting and disconnecting the same; and brake means mounted on said clutch means.

The above and other objects, features and advantages of the present invention will be readily apparent from the following description taken in conjunction with the accompanying drawing.

BRIEF DESCRIPTION OF THE DRAWING

The attached drawing is a cross-sectional view of a transmission according to the present invention.

DETAILED DESCRIPTION OF THE INVENTION

The present invention will now be described in detail with reference to the accompanying drawing. Reference numeral 1 denotes a final drive gear casing on which two hydraulic motors 2 and 3 which rotate in opposite directions are independently mounted. The hydraulic motors 2 and 3 have output shafts 4 and 5 connected thereto, respectively, which in turn have bevel pinions 6 and 7 fixedly mounted thereon.

Mounted within the final gear casing 1 through bearings 8 and 9 are final drive gear shafts 10 and 11 which are aligned with each other.

Fixedly mounted on inner ends of the final drive shafts 10 and 11 are bevel gears 12 and 13 with which the bevel pinions 6 and 7 are adapted to mesh. The other ends of the final drive shafts 10 and 11 are extended outside the final drive gear casing 1 through couplings 14 and 15, respectively, and drive gears 16 and 17 for driving right and left sides wheels (not shown) are fixedly mounted thereon.

Provided between the two final drive shafts 10 and 11 is a direct-coupling clutch 18 for coupling or connecting the two final shafts 10 and 11 with each other when engaged. The direct-coupling clutch 18 comprises a clutch housing 19 fixedly secured to one of the bevel gears 12 and a cylinder 20 fixedly secured to the other bevel gear 13. It is to be noted that the clutch housing 19 also functions as a brake drum as will be later explained. Formed on the inner peripheral surface of the clutch housing 19 are splines 21 with which the outer periphery of a plurality of annular plates 22 are engaged. Provided between each pair of the annular plates 22 are plurality of discs 23 having linings 24 formed thereon, inner ends of which are engaged with splines 25 formed on the outer peripheral surface of the cylinder 20.

Formed in the cylinder 20 is a cylinder chamber 26 in which a piston 27 is slidably mounted. The cylinder chamber 26 is connected with a hydraulic source (not shown) through a passage 28. The plates 22 and discs 23 are normally urged to contact with each other by the action of a spring 29 through a pressure plate 30 and is hydraulically released by introducing hydraulic fluid into the cylinder chamber 26 to move the piston 27 against the spring 29. Thus the two final drive shafts 10 and 11 are normally connected with each other through the clutch 18 and hydraulically disconnected from each other when required, such as, for turning the vehicle.

Mounted on and around the periphery of the clutch housing 19 is a band brake 31. By actuating the band brake 31, the rotation of the clutch housing 19 is retarded and therefore the two final drive shafts 10 and 11 are simultaneously braked.

Since according to the present invention, the band brake 31 is mounted on and around the clutch housing 19, the brake mounted direct-coupling clutch 18 is easily installed between the two final drive shafts 10 and 11 for connecting and disconnecting the same thereby improving the straight-run capability of the vehicle significantly.

For turning the vehicle, it is only necessary to disengage the clutch 18 by introducing hydraulic fluid into the cylinder chamber 26. Besides, by operating the band brake 31 while the clutch 18 remains engaged, the vehicle can be properly retarded or braked.

It should be understood that the present invention is not limited to the aforementioned embodiment only, but may be modified without departing from the scope of the appended claims.

What I claim is:

1. A transmission for a hydraulically driven vehicle, comprising:
    a final drive gear casing;
    a pair of hydraulic motor means each having an output shaft connected thereto, the each output shaft being extended into said final drive gear casing and having formed thereon a bevel pinion;

a pair of final drive shaft means each being rotatably supported by said final drive gear casing and aligned with each other;

a pair of bevel gears each fixedly mounted on said respective final drive shaft means, each of said bevel gearing being adapted to mesh with said respective bevel pinions;

clutch means provided between said pair of final drive shaft means for directly connecting and disconnecting said pair of final drive shaft means, said clutch means including a clutch housing fixedly secured to one of said bevel gears, cylinder means fixedly secured to the other of said bevel gears, said cylinder means having a hydraulic cylinder chamber formed therein, piston means mounted within said hydraulic cylinder chamber, a plurality of annular plates fixedly mounted on the inner face of said clutch housing, a plurality of discs mounted on said cylinder means, each of said discs being alternately arranged with respect to said annular plates, and spring means for urging said plurality of discs toward said annular plates; and brake means mounted on said clutch means.

2. A transmission as recited in claim 1 wherein said clutch housing functions as a brake drum and said brake means is a band brake mounted on said clutch housing.

* * * * *